United States Patent
Zink et al.

(10) Patent No.: US 6,211,919 B1
(45) Date of Patent: *Apr. 3, 2001

(54) TRANSPARENT EMBEDMENT OF DATA IN A VIDEO SIGNAL

(75) Inventors: Scott E. Zink, Portland; Daniel G. Baker, Beaverton, both of OR (US)

(73) Assignee: Tektronix, Inc., Beaverton, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,524

(22) Filed: Mar. 28, 1997

(51) Int. Cl.[7] .................................................. H04N 7/08

(52) U.S. Cl. ............................ 348/473; 348/461; 348/475

(58) Field of Search ........................... 348/473, 142, 348/461, 474, 475, 486, 398, 476–479; 380/7, 10–20; 398/462, 474; H04N 7/08

(56) References Cited

U.S. PATENT DOCUMENTS

| | | | |
|---|---|---|---|
| 4,616,261 | * | 10/1986 | Crawford et al. .................. 348/563 |
| 4,757,531 | * | 7/1988 | Lodge et al. ........................ 380/11 |
| 4,807,031 | * | 2/1989 | Broughton et al. ................ 348/460 |
| 4,969,041 | | 11/1990 | O'Grady et al. ................... 358/142 |
| 5,200,822 | * | 4/1993 | Bronfin et al. ..................... 348/460 |
| 5,243,423 | * | 9/1993 | DeJean et al. ..................... 348/473 |
| 5,387,941 | * | 2/1995 | Montgomery ...................... 348/473 |
| 5,410,360 | * | 4/1995 | Montgomery ...................... 348/473 |
| 5,463,720 | * | 10/1995 | Granger ............................. 395/109 |
| 5,555,024 | * | 9/1996 | Limberg ............................. 348/473 |
| 5,557,333 | * | 9/1996 | Jungo et al. ....................... 348/473 |
| 5,559,559 | * | 9/1996 | Jungo et al. ....................... 348/432 |
| 5,563,664 | | 10/1996 | Yang et al. . |
| 5,572,247 | * | 11/1996 | Montgomery et al. ............ 348/10 |
| 5,587,743 | * | 12/1996 | Montgomery ...................... 348/473 |
| 5,617,148 | * | 4/1997 | Montgomery ...................... 348/473 |
| 5,636,292 | * | 6/1997 | Rhoads ............................... 382/232 |
| 5,642,170 | * | 6/1997 | Hackett et al. .................... 348/459 |
| 5,659,613 | * | 8/1997 | Copeland et al. ................. 380/3 |
| 5,659,726 | * | 8/1997 | Sandford, II et al. ............ 707/101 |

(List continued on next page.)

FOREIGN PATENT DOCUMENTS

| | | | |
|---|---|---|---|
| 2174413 | | 5/1995 | (CA) .............................. H04L/9/32 |
| 374502 | * | 6/1990 | (EP) .............................. H04N/5/44 |
| 0397478 | | 11/1990 | (EP) . |

OTHER PUBLICATIONS

Zink et al. (Abstract by Derwent), Transparent Encoding Apparatus, EP 868082 (A2), Sep. 9, 1998.*
Taub et al Principles of Communication Systems, Second Edition, 1986, Chapter 17, pp. 720–749.*

*Primary Examiner*—John Peng
*Assistant Examiner*—Jean W. Desir
(74) *Attorney, Agent, or Firm*—Francis I. Gray

(57) ABSTRACT

A method and apparatus for transparently embedding data into a video signal modulates a particular carrier frequency with a randomized pattern representing the data. The randomized pattern may be a combination of the data with the output from a pseudo-random binary sequence generator, or the data may be converted first into a bi-orthogonal pattern selected from among a plurality of such patterns and then randomized. The resulting modulated carrier frequency is then amplitude modulated based upon a human visual model so that the modulated carrier frequency amplitude is greater in areas of high image complexity and lower in areas of low image complexity. The subliminal data represented by the modulated carrier frequency is added to the video signal. At a decoder the data is recovered using appropriate correlation techniques by first filtering the video signal to increase the subliminal data component relative to the image component, then demodulating the data component to produce the data pattern, and then correlating the data pattern with the possible data patterns to identify the particular pattern and associated data word.

49 Claims, 3 Drawing Sheets

U.S. PATENT DOCUMENTS

| | | | | |
|---|---|---|---|---|
| 5,661,527 | * | 8/1997 | Ferguson | 348/558 |
| 5,663,766 | * | 9/1997 | Sizer, II | 348/473 |
| 5,739,864 | * | 4/1998 | Copeland | 348/473 |
| 5,748,783 | * | 5/1998 | Rhoads | 382/232 |
| 5,768,426 | * | 6/1998 | Rhoads | 382/232 |
| 5,774,599 | * | 6/1998 | Muka et al. | 382/254 |
| 5,819,289 | * | 10/1998 | Sanford, II et al. | 707/104 |
| 5,832,119 | * | 11/1998 | Rhoads | 382/232 |

* cited by examiner

TRANSPARENT EMBEDMENT OF DATA IN A VIDEO SIGNAL

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates to data transmission, and more particularly to a method and apparatus for transparently embedding data within a video signal in order to indicate authentication, program ownership and/or reception-verification of the video signal.

Television signals are usually copyrighted or otherwise proprietary to the originator and, in the case of television network distribution, are distributed to affiliate stations for re-broadcast. Unauthorized re-broadcast is difficult to detect since it is often difficult to determine the creator or originator of the material from the material itself. This is particularly true for short sequences or when the video image has been cropped or modified to mask any identification logos that may have been explicitly burned into the video image.

Another common problem with television and video distribution, which is becoming more severe, is the synchronization of an aural or audio component that is to be distributed with the video signal. Modern digital signal processing techniques requiring large buffering, such as MPEG compression, add latency to the video distribution and, since the audio may be distributed or processed separately, an error in audio to video "lip-sync" or in sound to action often occurs. Sometimes this latency is variable, requiring continual re-synchronization. In addition to audio to video synchronization problems, the audio signal may be distorted or missing entirely. By embedding, for example, the audio envelope as data within the video signal, it is also possible to detect and compare the received audio with the original which was coded and embedded as data within the video signal as a quality measure as well as video to audio delay.

Another problem is with authentication of video signals representing visual images, possibly created by a computer, where it is desirable to detect a forgery or imposter signal. In this case the video signal may be replicated to such a degree that it is difficult to detect it from the authentic video sequence. Also it is sometimes desirable to detect the beginning and/or ending of a particular sub-sequence of a video signal, such as a motion test sequence for in-service video quality assessment of video processed by MPEG compression. It is possible to devise a remote receiver to capture a special test sequence segment of a distributed video signal and compare that segment to an undistorted, stored version to assess the quality of the video. Although it is possible to uniquely and reliably detect when the sequence occurs so that it, and only it, is captured, this generally requires the advance processing of a signature vector, transmission of that vector through a separate channel and a correlation means at the receiver. By transparently embedding data into the video a predetermined start and end code may be detected by the receiver without any preloading of signature vectors and signature vector preprocessing.

Published Canadian Patent Application No. 2,174,413 (A1) by Geoffrey B. Rhoads entitled "Identification/ Authentication Coding Method and Apparatus" discusses techniques for providing authentication of image signals. In Rhoads an imperceptible N-bit identification code is embedded throughout an image with a small noise pattern in a coded fashion. In particular bits of a binary identification code are referenced sequentially to add up to N independent, noise-like patterns to the original image signal. The detection of these patterns is done by N sequential correlations with stored replicas of each pattern. This may also be done simultaneously by N correlators, as is well described in the public domain as a "correlation receiver." Rhoads further discloses adding or subtracting exactly N independent, noise-like images to improve detection and/or encoded image quality. This later modification, referred to by Rhoads as "true polarity", is well described in the public domain as "bi-orthogonal signaling" for a correlation receiver allowing 2^N composite symbols (patterns) to be created by adding or subtracting N bi-orthogonal symbols (patterns). A disadvantage of both of Roads' methods is that each of the N noise-like patterns, which are added or subtracted to form one of the 2^N possible composite patterns, needs to be properly scaled and designed to minimize image degradation by the addition of the composite pattern to the image. A further disadvantage is that the original unencoded image, as well as the N patterns, need to be stored in the receiver so that the unencoded image may be subtracted from the encoded image for detection.

U.S. Pat. No. 4,969,041 issued Nov. 6, 1990 to William J. O'Grady and Robert J. Dubner entitled "Embedment of Data in a Video Signal" discloses adding one of a plurality of low-level waveforms to the video signal, with the level of the low level waveform being below the noise level of the video signal, for authentication purposes or for transmitting information. Each low-level waveform corresponds to a particular data word being embedded. At the receiving end the video signal is correlated with an identical set of low-level waveforms to produce a set of correlation coefficients—the highest correlation coefficient indicating the presence of a particular one of the low-level waveforms which is then converted into the corresponding data word. The Rhoads composite pattern consists of the summation of up to N independent patterns, which would be the same as O'Grady/Dubner when N=1 since only one pattern is sent at a time. For an N-bit data word O'Grady/Dubner implies the need for storage of 2^N patterns rather than the N patterns of Rhoads. But since 2^N patterns may be generated by summing N bi-orthogonal sub-patterns, the effect is the same and only N patterns need to be stored in a manner identical to Rhoads. In both of these patents the symbol rate is one pattern per picture or field.

Some other drawbacks of O'Grady/Dubner are that it limits the degree to which a pattern or sequence of patterns can be hidden by not fully exploiting the limitations of the human psychovisual process, such as spatial masking; it does not fully exploit the available signal to noise ratio since the correlation output is unipolar; and it does not include coding of the data represented by the embedded symbols so as to provide temporal redundancy for error correction over missing video frames.

What is desired is a method of embedding an unobtrusive data pattern into the video signal that is useful in addressing the above-noted problems.

BRIEF SUMMARY OF THE INVENTION

Accordingly the present invention provides a method and apparatus for transparently embedding data into a video signal by modulating a particular carrier frequency with a randomized pattern representing the data. The randomized pattern may be a combination of the data with the output from a pseudo-random binary sequence generator, or the data may be converted first into a bi-orthogonal pattern selected from among a plurality of such patterns and then randomized. The resulting modulated carrier frequency is then amplitude modulated based upon a human visual model so that the modulated carrier frequency amplitude is greater in areas of high image complexity and lower in areas of low image complexity. The subliminal data represented by the modulated carrier frequency is added to the video signal. At a decoder the data is recovered using appropriate correlation techniques by first filtering the video signal to increase the subliminal data component relative to the image component, then demodulating the data component to produce the data pattern, and then correlating the data pattern with the possible data patterns to identify the particular pattern and associated data word.

The objects, advantages and other novel features of the present invention are apparent from the following detailed description when read in conjunction with the appended claims and attached drawing.

DETAILED DESCRIPTION OF THE INVENTION

Figure 1:
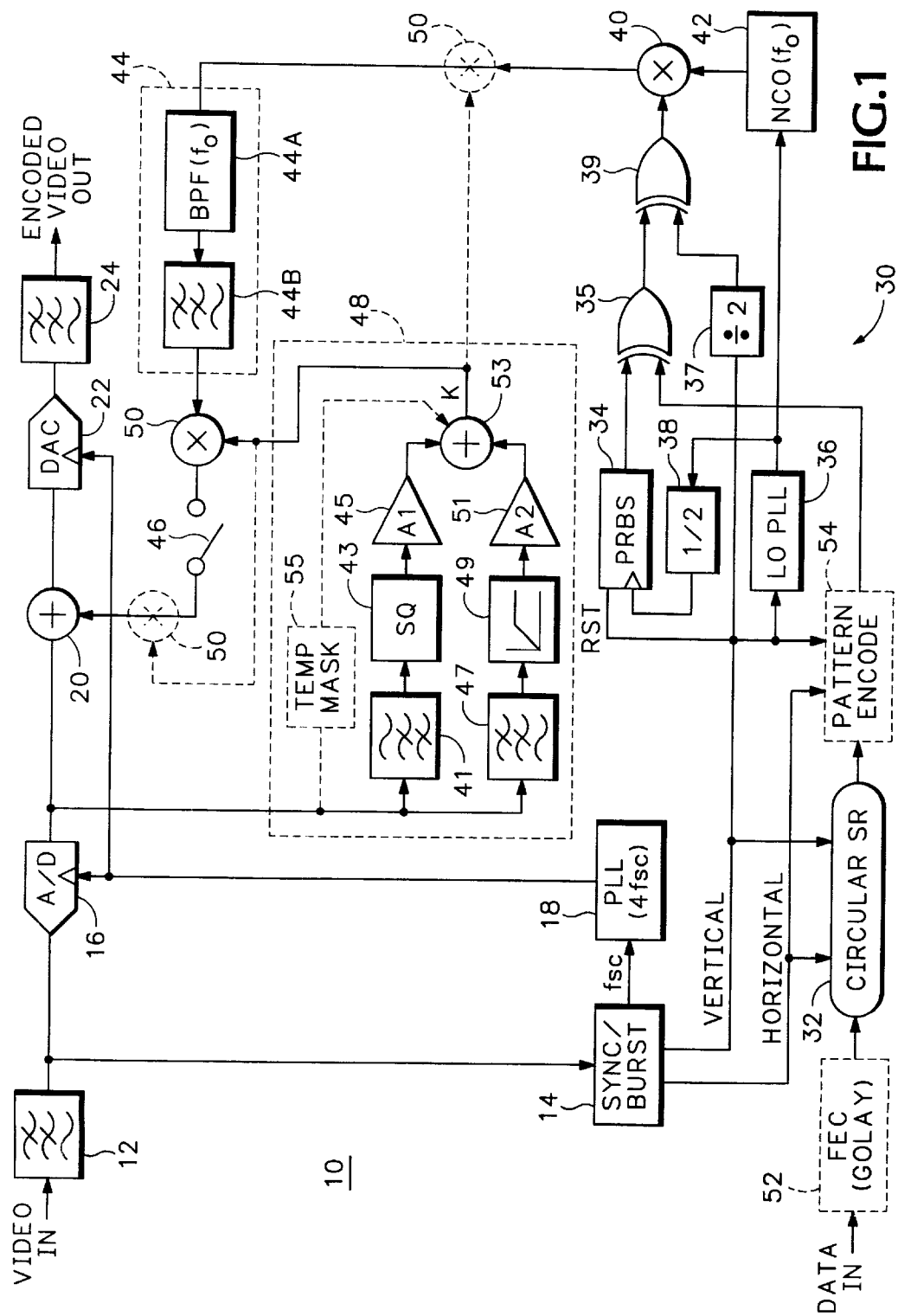
FIG. 1 is a block diagram view of an encoder for transparently embedding data in a video signal according to the present invention.

The invisibility of embedded data in a video signal is achieved by several independent factors acting together. The first factor is the principle of spectral spreading from Direct-Sequence Spread Spectrum (DSSS) modulation of a carrier frequency. The low-bandwidth/low-rate data patterns or symbols are modulated by a higher rate Pseudo Random Binary Sequence (PRBS), spreading the power spectrum around the carrier frequency so that the time-domain waveform appears noise-like or lacks the spatial coherence that the eye/brain is good at seeing even at low levels. Also by careful selection of the carrier frequency and phase it is possible to further reduce the visibility of the resulting spatial pattern created by the PRBS modulated symbols (patterns) on a DSSS modulated carrier.

Secondly it is also desirable to filter the embedded signal both vertically and horizontally to reduce edge visibility, further enhancing it's overall invisibility. A third factor that is significant is to exploit visual masking by varying the data signal level according to the video content.

Another factor is the selection of a Field Alternate Carrier (FAC) frequency and phase which becomes the DSSS modulated carrier. The invisibility of this carrier is a function of it's frequency, but it's phase from one field to the next is very important. A first-order cancellation occurs by repeating the entire data pattern on the even field (field 1) again on the odd field (field 2), but with an inverted carrier phase, causing an interlaced line pair cancellation. By repeating the data in each field, an even-line field comb filter may be used in a decoder to cancel the field to field correlated video and recover the data pattern with a 3 dB advantage at a cost of a 50% data-rate penalty. For progressive scan video systems the Field Alternate Carrier frequency and data repeat may be replaced by a Line Alternate Carrier frequency and data repeat. This gives the same or better visual cancellation and has the same data rate as the interlaced scan system.

With video signals the decoder is greatly simplified since carrier, code and data lock are simply derived from the abundant timing information in sync and burst. In addition to the rejection afforded by the comb filter, a bandpass filter is used to suppress the large carrier components of the program video signal. After the PRBS correlation, or de-spreading, various detection methods are possible. An integrate and dump matched filter driving a software, bi-orthogonal M-ary scheme may be used. Two options with and without channel coding also may be used. Numerous alternatives include combining convolution coding with Walsh code assignments (Ungerboech TCM and concatenated RS and convolution.

Channel coding is best done in a holographic, two-dimensional (2D) sense by shuffling or the like for robustness against video motion of pixel segments passed through the comb filter. Such 2D holographic shuffling of data may be extended to three-dimensional (3D) shuffling because video has a time sense unlike still pictures. This may be done by repeating some of the data over several frames, which could be valuable for video sequence identification. The data that identifies the video sequence may be given a lower energy, i.e., fewer pixels, than the data that identifies the particular frame within the video sequence, since the frames come only once while the sequence has many frames in it. Data security through data encryption may always be applied separately from the channel coding, allowing the decoder design to be public or even standardized.

Referring now to FIG. 1 an encoder 10 is shown having an analog video signal which is input to an anti-aliasing, lowpass filter 12, the output of which is input to a sync/burst separator 14 to generate necessary timing signals and to an analog to digital converter (ADC) 16 to produce a digital video signal. A sample clock phase locked loop (PLL) 18 in response to one of the timing signals (subcarrier frequency fsc) from the sync/burst generator 14 provides a sample clock at four times subcarrier (4fsc). Where the input signal is a digital video signal, the timing signals are extracted from the digital video signal and the lowpass filter 12 and ADC 16 are not needed. The digital video signal is input to an adder 20 where a subliminal data signal is added to the digital video signal. The resulting digital video signal is input to a digital to analog converter (DAC) 22 to produce a modulated analog video signal which in turn is processed by an output lowpass reconstruction filter 24 to produce a final encoded analog video signal. For digital distribution the DAC 22 and filter 24 may be eliminated.

A modulator circuit 30 generates the subliminal data signal for input to the adder 20. The modulator circuit 30 has as inputs the vertical and horizontal timing signals from the sync/burst separator 14 and the desired subliminal data to be added to the digital video signal. The subliminal data is input to a circular shift register 32 which has as inputs the horizontal and vertical sync signals. The subliminal data from the circular shift register 32 may be input to an exclusive OR gate 35 where it is combined with the output from a pseudo random binary sequence (PRBS) generator 34. The PRBS generator 34 is reset by the vertical sync signal and clocked by a clock signal derived via a local PLL 36 and a divider 38. The output from the exclusive OR gate 35 is a series of +/−1's which is then input to a mixer 40. A numerically controlled oscillator (NCO) 42 provides a modulator frequency of that also is input to the mixer 40. The output from the mixer 40 is a modulated frequency signal which is the DSSS signal as modulated by the output from the PRBS generator 34 and the data from the circular shift register 32.

To provide the Field Alternate Carrier frequency an inversion of the phase of either of the inputs to the modulator 40 is performed using a divide-by-two circuit 37 having the vertical interval timing signal as an input followed by another exclusive OR gate 39. The exclusive OR gate 39 has as shown the other input coupled to the output of the first exclusive OR gate 35, the output being coupled to the modulator 40. Alternatively the exclusive OR gate 39 may be inserted between the NCO 42 and the modulator 40, between the circular shift register 32 and the first exclusive OR gate 35, or between the PRBS generator 34 and the first exclusive OR gate. For progressive scan systems the input to the divide-by-two circuit 37 would be the horizontal interval timing signal so that the Line Alternate Carrier frequency is implemented. In either case alternate lines in each complete frame of the video image sequence have the same data, but inverted in phase, so that subtraction of alternate lines by a comb filter in a decoder enhances the subliminal data signal.

The modulated frequency is input to two-dimensional, horizontal and vertical spatial frequency, softening filters 44. The horizontal filter 44A is centered about the modulator frequency of to mitigate any fast edges in the modulated frequency signal, and the vertical filter 44B mitigates fast vertical edges (line-to-line transitions). The modulated frequency signal is the subliminal data signal that is input to the adder 20 via a blanking gate 46 so that the addition occurs only during the active video portion of the digital video signal.

A human vision model (HVM) circuit 48 has as inputs the digital video signal at the input to the adder 20. One practical implementation of visual masking based upon the human visual model is shown. A first aspect of the human visual model is noise tolerance in areas of high spatial detail, and this is controlled by a two-dimensional highpass filter 41, such as a Sobel filter, followed by an envelope squarer 43 and a first control amplifier 45. A second aspect is sensitivity to noise at different local contrasts, and this is controlled by a two-dimensional lowpass filter 47 followed by a transfer offset circuit 49 and a second control amplifier 51. The parameters A1 and A2 represented by the first and second control amplifiers 45, 51 are adjusted for a desired minimum data pattern visibility over a range of picture material. A third aspect may be that of temporal masking 55 where noise on screen cuts or motion is temporarily less visible. The resulting outputs from these paths, describing the complexity of the image rendered by the digital video signal, are summed by a summer 53 to produce a gain signal to control a multiplier 50 to which the modulated frequency signal is input prior to the adder 20. Thus for portions of the digital video signal where the image is unchanging in motion and/or has low spatial detail and contrast or color/shading variations, the gain is relatively low; and where the image is complex due to motion and/or high spatial detail, the gain is relatively high. In fact the amplitude of the subliminal data signal does not need to be less than the noise floor in complex regions of the video digital signal to retain an acceptable level of invisibility.

Figure 2:
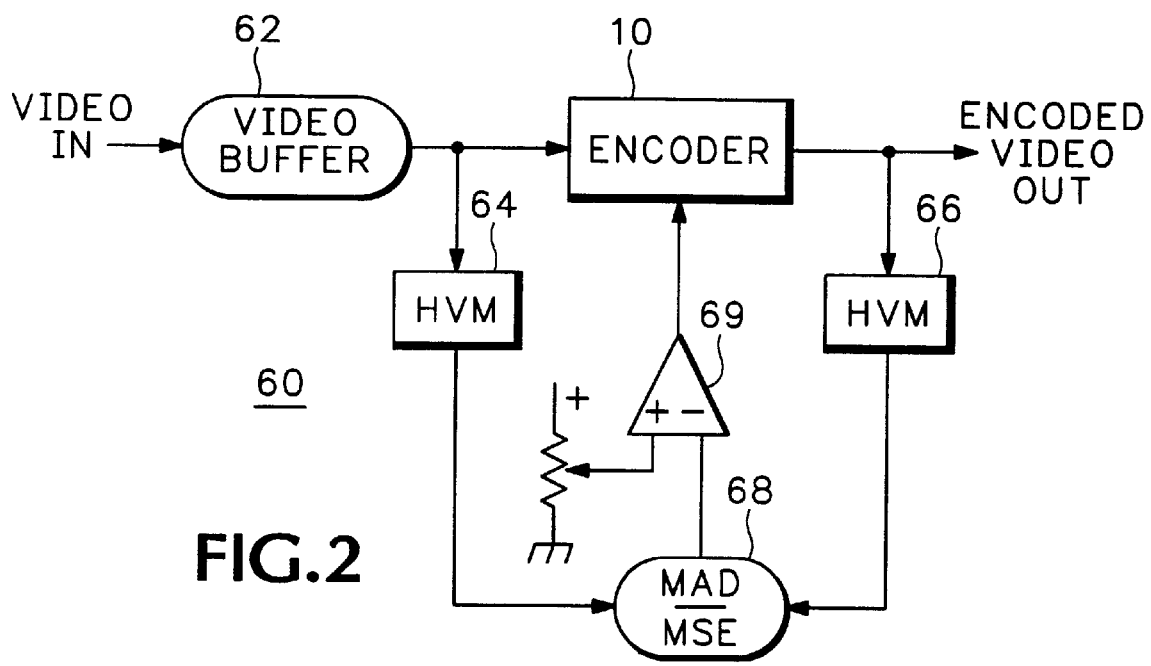
FIG. 2 is a block diagram view of a feedback model for determining parameter values for a human visual model according to the present invention.

A feedback model 60 for determining the parameter values A1, A2 represented by the first and second control amplifiers 45, 51 and the transfer curve of the transfer-offset circuit 49 is shown in FIG. 2. A desired or acceptable distortion value is pre-set and dynamically maintained by feedback based on the human visual model. An image sequence is stored in a video buffer 62 and repeatedly output in order to compare the output from the human visual model 64 prior to the encoder 10 with the image sequence derived from the output of the human visual model 66 following the data encoder. The comparison between the human visual model outputs is performed by means of a means absolute difference or mean square error algorithm 68. The resulting difference or error is input to a comparator 69 to which also is input a distortion level which is adjustable to the desired level of invisibility. The parameters of the first and second control amplifiers 45, 51 and the transfer curve of the transfer-offset circuit 49 are adjusted to maintain comparator 69 output high. This is repeated over a range of exemplary image sequences. This then produces an acceptable estimate of these parameters which may be fixed for all video to be encoded. The human visual model is only as elaborate as necessary to match the dominant elements of the human visual system as it relates to the desired level of masking.

This feedback model may also be used without the masking modulator 48 in an iterative manner to directly determine the pattern level gain signal for input to the multiplier 50. In other words a vector or array of gain signal values, maximized for each pixel, may be determined based on the human visual model feedback, optimizing the root mean square (RMS) value of the embedded pseudo-noise pattern while maintaining the desired level of distortion.

Forward error correction may be added to the modulator 30 by inputting the subliminal data to a forward error correction (FEC) circuit 52 prior to input into the circular shift register 32. This will provide error correction for bit or byte errors when the data from the circular shift register 32 is input directly to exclusive OR gate 35. The FEC circuit 52 may use a bit-error correction code, such as Golay codes, as the forward error correction algorithm to improve the data integrity for bit errors, or a more sophisticated channel coding such as concantenated convolution and Reed-Solomon (RS) code may be used, as is well known in the art. These coding techniques combined with bit shuffling provide error correction across frames so that entire frames may be lost without any loss in data. For example FEC 52 may be designed to provide RS word-error correction where each frame contains a coded binary word of a fixed length of m data bits, allowing missing words (frames) to be completely recovered from the redundancy in adjacent words (frames). In this case the output from the circular shift register 32 may be input to an orthogonal pattern selector 54, such as a Walsh encoder, to produce the subliminal data coded to select one of a set of orthogonal patterns input to the exclusive OR gate 35. Walsh codes are one-dimensional orthogonal sequences used in the well-known IS-95 Code Division Multiple Access wireless telephone standard. Also Walsh sequences are the basis for a particularly well-known set of two-dimensional orthogonal patterns called Haadamard patterns. Orthogonal patterns are those that, when correlated with all other patterns in the set, produce a positive correlation coefficient for only one of the patterns, with all of the other patterns producing a zero correlation coefficient. Where each pattern represents m bits, a total of $2^m$ patterns are required and the data from the circular shift register 32 acts as an address to the pattern selector 54. By using bi-orthogonal patterns only $2^{(m-1)}$ patterns or sequences are needed for m bits. These patterns may be input directly to the mixer 40 without the need of exclusive OR gate 35, but the bi-orthogonal patterns or Walsh sequences may not all appear visually random, which would make them more visible when added to the program video signal. However when this pattern is exclusive OR'd with the PRBS generator output, the resulting light pattern at the output of the modulator 40 becomes much more random in appearance and is difficult to distinguish from noise. The resulting modulation is a randomized bi-phase modulation spreading the spectral energy around the carrier. Circular shift register 32 allows the data or data pattern to be repeated on interlaced fields so that the visual line pair cancellation and field comb data separator in the decoder may be used, as described above.

Figure 3:
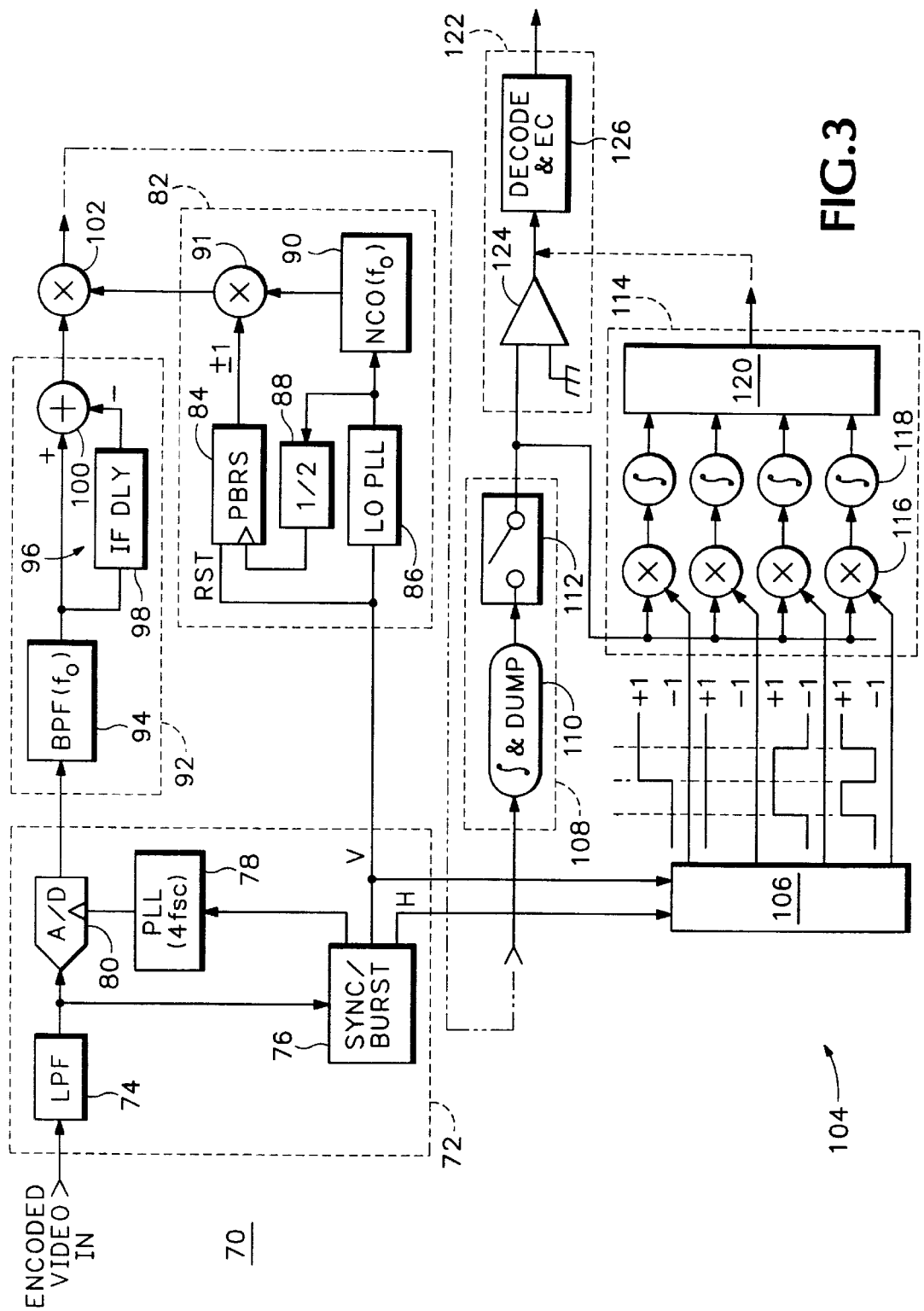
FIG. 3 is a block diagram view of a decoder for extracting embedded data in the video signal according to the present invention.

A decoder 70 is shown in FIG. 3. The input section 72 is the same as for the encoder 10, having a lowpass anti-aliasing filter 74, a sync/burst separator 76 to generate the timing signals, a PLL 78 to generate the sample clock and an analog to digital converter 80 to produce the digital video signal. The decoder 70 also includes a Local Oscillator (LO) section 82 which includes a PRBS generator 84 with PLL 86 and divider 88 and a numerically controlled oscillator (NCO) 90 that produces the demodulation carrier frequency of. The outputs from the PRBS generator 84 and the NCO 90 are input to a mixer 91 to produce a pseudo random demodulated LO signal (BPSK—Bi-Phase Shift Keyed) for a down-converter mixer 102.

The digital video signal is input to preprocessing filters 92 that include a bandpass filter 94 centered at the modulator frequency and a high pass field-comb filter 96 including a field delay 98 and a subtractor 100. These filters remove much of the program video signal, enhancing the detection of the subliminal embedded data signal. The field-comb filter 96 is particularly effective since the embedded data pattern is repeated with inverse polarity on adjacent fields, doubling it's level at the filter output while the program video signal that is correlated on adjacent fields is removed. The filtered digital video signal is input to the down-converter mixer 102 and mixed together with the pseudo random modulated LO frequency signal. The resulting baseband digital signal is input to a correlation/matched filter circuit 104.

The correlation/matched filter circuit 104 has as inputs the baseband digital signal and the horizontal and vertical interval timing signals. The timing signals are input to an orthogonal pattern generator 106, such as a Walsh generator, that is comparable to that in the encoder 10. The timing signals are also input to a matched filter 108 to which also is input the baseband digital signal. The matched filter 108 includes an integrate and dump circuit 110 followed by a sampler 112. If the embedded data is only as bits encoded with an FEC channel code, as discussed previously, matched filter 108 output may be converted to binary data by slicer 124 and input directly to FEC decoder 126 to output the decoded and error corrected subliminal data. In the case where the data is coded as bi-orthogonal patterns, the output from the sampler 112 is input to a bi-orthogonal correlation receiver 114 that includes a correlation mixer 116 for each of the patterns produced by the pattern generator 106 so that the sampler output is correlated with each pattern. The outputs from the correlation mixers 116 are integrated by respective integrators 118, the outputs of which are input to a maximum magnitude selector 120. Due to the orthogonality of the patterns only one of the outputs from the integrators 118 has a significant magnitude that is detected by the magnitude and magnitude polarity selector 120 as one of the predetermined m bit patterns or data words assigned to each pattern. These m data words may have been FEC coded as described previously. In this case the error corrector 126 is designed to correct word errors based upon the redundancy in other decoded data words in order to correct data errors from missing video frames or from heavily distorted embedded data patterns. The magnitude selector 120 detects not only the greatest magnitude, but the polarity of that magnitude to provide an extra bit. In other words eight patterns represent three bits plus one bit for the eight inverted patterns, providing m=4 bits.

The subliminal data channel provided by the present invention may be used for stamping an identifying mark on a video sequence even if some of the video frames have been lost or portions of video frames have been cropped or distorted through lossy compression/decompression processing. The identifying mark may represent an audio signal or at least a signature of the audio into the active video to allow a remote video receiver to compare the audio signature with the received audio to automatically advance or delay the relative audio to video timing to maintain sound to video synchronization as encoded at the source. The subliminal data channel may represent modem cryptographic digital signature authentication in the video. It may be used to identify a motion test sequence, or portion thereof, to be captured for video quality assessment, such as discussed in U.S. Pat. No. 5,818,520, issued on Oct. 6, 1998 to Bozidar Janko and David K. Fibush entitled "Programmable Instrument for Automatic Measurement of Compressed Video Quality". The subliminal data channel also may be used to analyze timeliness of service, i.e., did the video get aired at the desired time in its entirety?

Thus the present invention provides for transparently encoding data into a video image by modulating a particular carrier frequency, providing interlaced field visual masking with a unique one of 2^(m-1) bi-orthogonal patterns, the pattern representing m bits, randomizing the pattern with a PRBS sequence to reduce visibility, amplitude modulating the random pattern modulated carrier to further maximize embedded signal amplitude and minimize visibility based on a human visual model exploiting visual masking, and adding the resulting pattern modulated frequency signal to the video such that the data is recoverable using appropriate correlation techniques.

What is claimed is:

1. An apparatus for transparently encoding data within a video signal comprising:

means for generating from the data to be encoded and video timing signals associated with the video signal a spread spectrum, two-dimensional randomized binary noise-like pattern;

means for modulating the randomized binary pattern onto a carrier frequency to produce a subliminal data signal; and means for combining the subliminal data signal with the video signal to produce an output video signal having the data transparently encoded within the video signal.

2. The apparatus as recited in claim 1 wherein the data to be encoded comprises a representation of an audio signal for detecting and correcting relative audio to video timing at a receiver to maintain sound to video synchronization as encoded at a source.

3. The apparatus as recited in claim 1 wherein the data to be encoded comprises digital signature authentication information for identifying a source of the video signal.

4. The apparatus as recited in claim 1 wherein the data to be encoded comprises an identifier for a motion test sequence to be captured for video quality assessment.

5. An apparatus for transparently encoding data within a video signal comprising:
   means for generating from the data to be encoded and video timing signals associated with the video signal a spread spectrum randomized binary pattern;
   means for modulating the spread spectrum randomized binary pattern onto a carrier frequency to produce a subliminal data signal;
   means for alternating the phase of the subliminal data signal on alternate lines of each frame of the video signal such that each pair of contiguous lines has the same data but inverted in polarity; and
   means for combining the subliminal data signal with the video signal to produce an output video signal having the data transparently encoded within the video signal.

6. The apparatus as recited in claim 5 wherein the alternating means comprises:
   means for dividing a specific one of the video timing signals by two to produce a phase inversion control signal; and
   means for inverting the phase of the subliminal data signal on alternate lines of each frame in response to the phase inversion signal.

7. The apparatus as recited in claim 6 wherein for an interlaced version of the video signal the specific one of the video timing signals is a field rate signal and for a progressive scan version of the video signal the specific one of the video timing signals is a line rate signal.

8. An apparatus for transparently encoding data within a video signal comprising:
   means for generating from the data to be encoded and video timing signals associated with the video signal a spread spectrum randomized binary pattern;
   means for modulating the spread spectrum randomized binary pattern onto a carrier frequency to produce a subliminal data signal;
   means for amplitude modulating the subliminal data signal with a gain signal based upon a human visual model; and
   means for combining the subliminal data signal with the video signal to produce an output video signal having the data transparently encoded within the video signal.

9. The apparatus as recited in claims 1, 5 or 8 further comprising means for softening edges in the subliminal data signal prior to the combining means.

10. A method of transparently encoding data within a video signal comprising the steps of:
    generating from the data to be encoded and video timing signals associated with the video signal a spread spectrum, two-dimensional randomized binary noise-like pattern;
    modulating the randomized binary pattern onto a carrier frequency to produce a subliminal data signal; and
    combining the subliminal data signal with the video signal to produce an output video signal having the data transparently encoded within the video signal.

11. The method as recited in claim 10 further comprising the step of shuffling the data two-dimensionally to provide channel coding.

12. The method as recited in claim 10 further comprising the step of shuffling the data three-dimensionally to provide channel coding.

13. The method as recited in claim 10 wherein the data to be encoded comprises a representation of an audio signal for detecting and correcting relative audio to video timing at a receiver to maintain sound to video synchronization as encoded at a source.

14. The method as recited in claim 10 wherein the data to be encoded comprises digital signature authentication information for identifying a source of the video signal.

15. The method as recited in claim 10 wherein the data to be encoded comprises an identifier for a motion test sequence to be captured for video quality assessment.

16. A method of transparently encoding data within a video signal comprising the steps of:
    generating from the data to be encoded and video timing signals associated with the video signal a spread spectrum randomized binary pattern;
    modulating the spread spectrum randomized binary pattern onto a carrier frequency to produce a subliminal data signal;
    alternating the phase of the subliminal data signal on alternate lines of each frame of the video signal such that each pair of contiguous lines has the same data but inverted in polarity; and
    combining the subliminal data signal with the video signal to produce an output video signal having the data transparently encoded within the video signal.

17. The method as recited in claim 16 wherein the alternating step comprises the steps of:
    dividing a specific one of the video timing signals by two to produce a phase inversion control signal; and
    inverting the phase of the subliminal data signal on alternate lines of each frame in response to the phase inversion signal.

18. The method as recited in claim 17 wherein for an interlaced version of the video signal the specific one of the video timing signals is a field rate signal and for a progressive scan version of the video signal the specific one of the video timing signals is a line rate signal.

19. A method of transparently encoding data within a video signal comprising the steps of:
    generating from the data to be encoded and video timing signals associated with the video signal a spread spectrum randomized binary pattern;
    modulating the spread spectrum randomized binary pattern onto a carrier frequency to produce a subliminal data signal;
    amplitude modulating the subliminal data signal with a gain signal based upon a human visual model; and
    combining the subliminal data signal with the video signal to produce an output video signal having the data transparently encoded within the video signal.

20. The method as recited in claims 10, 16 or 19 further comprising the step of softening edges in the subliminal data signal prior to the combining step.

21. An apparatus for transparently embedding data within a video signal comprising:
    a pattern generator having as inputs timing signals associated with the video signal and the data to be embedded and producing as an output a spread spectrum, two-dimensional randomized pattern noise-like signal;
    a modulator having as inputs the randomized pattern signal and a carrier frequency synchronized with the randomized pattern signal and producing as an output a subliminal data signal; and
    a combiner having as inputs the subliminal data signal and the video signal and producing as an output a transparently embedded data video signal.

22. The apparatus as recited in claim 21 wherein the pattern generator comprises:

a data pattern generator having as inputs the data to be embedded and the timing signals and producing as an output a binary pattern;

a pseudo random binary sequence generator having as an input one of the timing signals and producing as an output a random binary sequence;

a combination circuit having as inputs the binary pattern and the random binary sequence and producing as an output the randomized binary pattern.

23. The apparatus as recited in claim 22 wherein the data pattern generator comprises a circular shift register having as inputs the data and the timing signals and producing as an output the binary pattern.

24. The apparatus as recited in claim 23 wherein the data pattern generator further comprises a pattern encoder having the output from the circular shift register and the timing signals as inputs and producing as an output the binary pattern.

25. The apparatus as recited in claim 24 wherein the data pattern generator provides a plurality of bi-orthogonal binary patterns, with the one selected for output as the binary pattern being determined by the output from the circulating shift register.

26. The apparatus as recited in claim 24 wherein the data pattern generator comprises a Walsh encoder having as input the output from the circular shift register and producing as an output the binary pattern selected from among a plurality of bi-orthogonal patterns.

27. The apparatus as recited in claim 21 wherein the combination circuit comprises an exclusive OR gate having as inputs the binary pattern and the random binary sequence and producing as an output the randomized binary pattern.

28. An apparatus for transparently embedding data within a video signal comprising:

a pattern generator having as inputs timing signals associated with the video signal and the data to be embedded and producing as an output a spread spectrum randomized pattern signal;

a modulator having as inputs the spread spectrum randomized binary signal and a carrier frequency synchronized with the spread spectrum randomized pattern signal and producing as an output a subliminal data signal;

a phase alternator circuit having as inputs a specific one of the video timing signals and a component of the subliminal data signal and having as an output a signal that produces inversion of the phase of the subliminal data signal on alternate lines of each frame of the video signal such that each pair of contiguous lines has the same data but inverted in polarity; and a combiner having as inputs the subliminal data signal and the video signal and producing as an output a transparently embedded data video signal.

29. The apparatus as recited in claim 28 wherein the phase alternator circuit comprises:

a divide-by-two circuit having as an input the specific one of the video timing signals and having as an output a phase inversion control signal; and an exclusive OR gate having as inputs the phase inversion control signal and the component of the subliminal data signal and having as an output the signal for inverting the phase of the subliminal data signal.

30. The apparatus as recited in claim 29 wherein for an interlaced version of the video signal the specific one of the video timing signals is a field rate signal and for a progressive scan version of the video signal the specific one of the video timing signals is a line rate signal.

31. An apparatus for transparently encoding data within a video signal comprising:

a pattern generator having as inputs timing signals associated with the video signal and the data to be embedded and producing as an output a spread spectrum randomized pattern signal;

a modulator having as inputs the spread spectrum randomized pattern signal and a carrier frequency synchronized with the spread spectrum randomized pattern signal and producing as an output a subliminal data signal;

a softening filter having as an input the subliminal data signal and producing as an output a filtered subliminal data signal; and a combiner having as inputs the filtered subliminal data signal and the video signal and producing as an output a transparently embedded data video signal.

32. The apparatus as recited in claims 21, 28 or 31 further comprising an amplitude modulator having as inputs the subliminal data signal and a gain control signal based upon a human visual model and producing as an output an amplitude modulated subliminal data signal as the subliminal data signal for input to the combiner.

33. The apparatus as recited in claim 31 wherein the softening filter comprises:

a horizontal bandpass filter centered on the carrier frequency having as an input the subliminal data signal and producing as an output a horizontally filtered subliminal data signal; and a vertical lowpass filter having as an input the horizontally filtered subliminal data signal and producing as an output the filtered subliminal data signal.

34. The apparatus as recited in claim 32 further comprising:

a highpass human visual model filter having as an input the video signal and producing as an output a highpass filtered video signal representing high spatial detail;

a lowpass human visual model filter having as an input the video signal and producing as an output a lowpass filtered video signal representing local contrast; and a combining circuit having as inputs the lowpass and highpass filtered video signals and producing as an output the gain signal.

35. The apparatus as recited in claim 34 further comprising a temporal human visual model filter having as an input the video signal and producing as an output a temporally filtered video signal, the temporally filtered video signal being applied as another input to the combining circuit so that the gain signal is a combination of the lowpass, highpass and temporally filtered video signals.

36. The apparatus as recited in claim 32 wherein the amplitude modulator is inserted between the modulator and the softening filter.

37. The apparatus as recited in claim 32 wherein the amplitude modulator is inserted between the softening filter and the combiner.

38. The apparatus as recited in claims 21, 28, or 31 further comprising a forward error correction circuit having as an input the data to be transparently encoded within the video signal and producing as an output a forward corrected data signal coupled to the input of the pattern generator.

39. An apparatus for extracting transparently embedded data from a video signal where the embedded data is a spread spectrum, two-dimensional randomized binary noise-like pattern modulated onto a carrier frequency comprising:

means for demodulating the video signal about the carrier frequency with a random binary sequence modulated carrier frequency to produce a broadband video signal; and means for correlating the broadband video signal with a plurality of binary patterns to recover the embedded data.

40. An apparatus for extracting transparently embedded data from a video signal where the embedded data is a spread spectrum randomized binary pattern modulated onto a carrier frequency that is repeated on alternate lines of each frame of the video signal with opposite phase comprising:

means for filtering the video signal to enhance the embedded data with respect to the video content of the video signal;

means for demodulating the filtered video signal about the carrier frequency with a pseudo-random binary sequence modulated carrier frequency to produce a broadband video signal; and means for correlating the broadband video signal with a plurality of binary patterns to recover the embedded data.

41. The apparatus as recited in claim 40 wherein the filtering means comprises:

means centered on the carrier frequency for broadband filtering the video signal to produce a first filtered video signal; and means for comb filtering the first filtered video signal to produce the video signal for input to the demodulating means.

42. A method of extracting transparently embedded data from a video signal where the embedded data is a spread spectrum, two-dimensional randomized binary noise-like pattern modulated onto a carrier frequency comprising the steps of:

demodulating the video signal about the carrier frequency with a random binary sequence modulated carrier frequency to produce a broadband video signal; and correlating the broadband video signal with a plurality of binary patterns to recover the embedded data.

43. A method of extracting transparently embedded data from a video signal where the embedded data is a spread spectrum randomized binary pattern modulated onto a carrier frequency that is repeated on alternate lines of each frame of the video signal with opposite phase comprising the steps of:

filtering the video signal to enhance the embedded data with respect to the video content of the video signal;

demodulating the video signal about the carrier frequency with a pseudo-random binary sequence modulated carrier frequency to produce a broadband video signal; and correlating the broadband video signal with a plurality of binary patterns to recover the embedded data.

44. The method as recited in claim 43 wherein the filtering step comprises the steps of:

broadband filtering the video signal about the carrier frequency to produce a first filtered video signal; and comb filtering the first filtered video signal to produce the video signal for input to the demodulating step.

45. An apparatus for extracting transparently embedded data from a video signal where the embedded data is a spread spectrum, two-dimensional randomized binary noise-like pattern modulated onto a carrier frequency comprising:

a demodulator having as inputs a random binary sequence modulated carrier frequency and the video signal and producing as an output a broadband video signal; and a correlation receiver having as inputs the broadband video signal and timing signals associated with the video signal for comparing the broadband video signal with a plurality of binary patterns to recover as an output the embedded data.

46. The apparatus as recited in claim 45 wherein the demodulator comprises:

a pseudo random binary sequence generator having as an input one of the timing signals and providing as an output a random binary sequence;

a numerically controlled oscillator having as an input a control signal derived from the one timing signal and providing as an output the carrier frequency;

a first modulator having as inputs the carrier frequency and the random binary sequence and producing as an output a modulated carrier frequency; and a second modulator having as inputs the video signal and the modulated carrier frequency and producing as an output the broadband video signal.

47. The apparatus as recited in claim 45 wherein the correlation receiver comprises:

a sampler having as an input the broadband video signal and producing as an output a sampled video signal;

a pattern buffer having as inputs the timing signals and providing as outputs in parallel a plurality of binary patterns;

a plurality of correlation circuits in parallel, each having as inputs the sampled video signal and a specific one of the plurality of binary patterns and producing as an output a specific correlation coefficient; and a magnitude comparator having as inputs the correlation coefficients from each correlation circuit and producing as an output a binary data word representing the sign and value of the greatest of the correlation coefficients, the binary data word being the embedded data.

48. An apparatus for extracting transparently embedded data from a video signal where the embedded data is a spread spectrum randomized binary pattern modulated onto a carrier frequency that is the same on alternate lines of each frame of the video signal with opposite phase comprising:

a filter having as an input the video signal and producing as an output a filtered video signal, the filter enhancing the embedded data with respect to the video content of the video signal;

a demodulator having as inputs a pseudo-random binary sequence modulated carrier frequency and the filtered video signal and producing as an output a broadband video signal; and a correlation receiver having as inputs the broadband video signal and timing signals associated with the video signal for comparing the broadband video signal with a plurality of binary patterns to recover as an output the embedded data.

49. The apparatus as recited in claim 48 wherein the filter comprises:

a broadband filter centered on the carrier frequency having as an input the video signal and producing as an output a first filtered video signal; and a field comb filter having as an input the first filtered video signal and producing as an output the filtered video signal coupled to the input of the demodulator.

* * * * *